Figure 1:
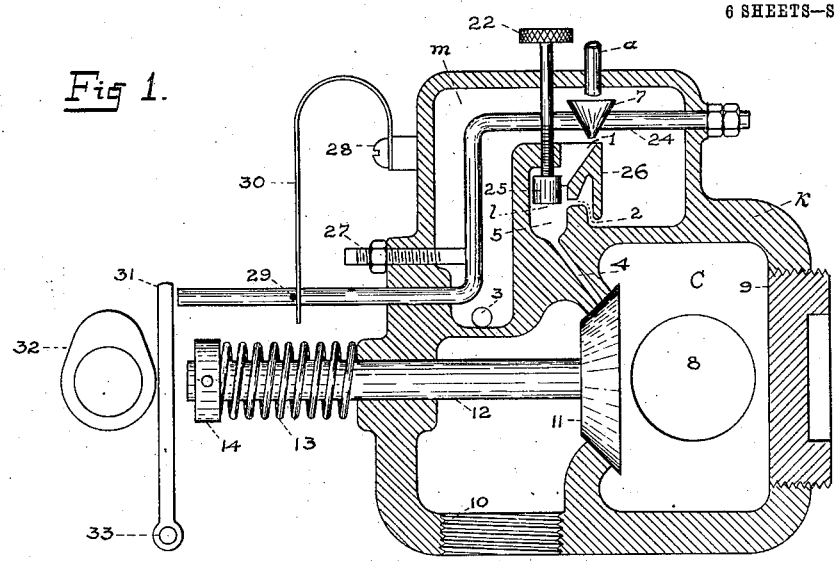

No. 889,260. PATENTED JUNE 2, 1908.
T. E. PODLESAK & H. J. PODLEŠÁK.
FUEL FEEDING DEVICE FOR INTERNAL COMBUSTION HYDROCARBON MOTORS.
APPLICATION FILED JULY 9, 1902.

6 SHEETS—SHEET 1.

WITNESSES:

INVENTORS:

No. 889,260. PATENTED JUNE 2, 1908.
T. E. PODLESAK & H. J. PODLEŠÁK.
FUEL FEEDING DEVICE FOR INTERNAL COMBUSTION HYDROCARBON MOTORS.
APPLICATION FILED JULY 9, 1902.

6 SHEETS—SHEET 2.

WITNESSES:

INVENTORS:

No. 889,260. PATENTED JUNE 2, 1908.
T. E. PODLESAK & H. J. PODLEŠÁK.
FUEL FEEDING DEVICE FOR INTERNAL COMBUSTION HYDROCARBON MOTORS.
APPLICATION FILED JULY 9, 1902.

6 SHEETS—SHEET 3.

WITNESSES.
INVENTORS.

No. 889,260. PATENTED JUNE 2, 1908.
T. E. PODLESAK & H. J. PODLEŠÁK.
FUEL FEEDING DEVICE FOR INTERNAL COMBUSTION HYDROCARBON MOTORS.
APPLICATION FILED JULY 9, 1902.

6 SHEETS—SHEET 4.

WITNESSES.
INVENTORS.

No. 889,260. PATENTED JUNE 2, 1908.
T. E. PODLESAK & H. J. PODLEŠÁK.
FUEL FEEDING DEVICE FOR INTERNAL COMBUSTION HYDROCARBON MOTORS.
APPLICATION FILED JULY 9, 1902.

6 SHEETS—SHEET 5.

WITNESSES:

INVENTORS:

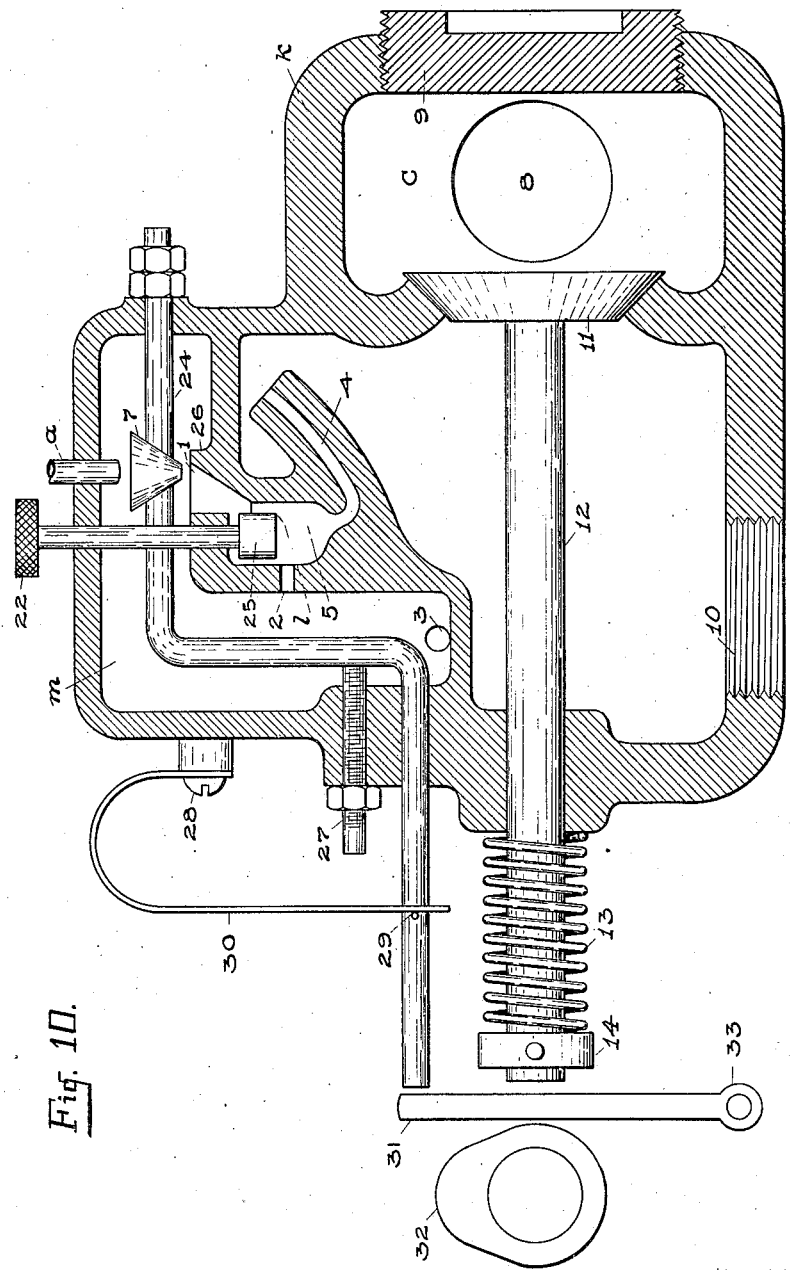

UNITED STATES PATENT OFFICE.

TESLA E. PODLESAK, OF WEST NEW BRIGHTON, NEW YORK, AND HENRY J. PODLEŠÁK, OF CHICAGO, ILLINOIS.

FUEL-FEEDING DEVICE FOR INTERNAL-COMBUSTION HYDROCARBON-MOTORS.

No. 889,260.  Specification of Letters Patent.  Patented June 2, 1908.

Application filed July 9, 1902. Serial No. 114,975.

*To all whom it may concern:*

Be it known that we, TESLA EMIL PODLESAK and HENRY JOSEPH PODLEŠÁK, citizens of the United States, and residing at West New Brighton, county of Richmond, State of New York, and Chicago, county of Cook, State of Illinois, respectively, have invented certain new and useful Improvements in Fuel-Feeding Devices for Internal-Combustion Hydrocarbon-Motors, of which the following is a clear and precise description, reference being had to the several views of the accompanying drawings.

Our invention relates to improvements in internal combustion hydro-carbon motors, the object being to provide means for feeding the hydro-carbon fuel in exactly predetermined and proper quantities for each charge and to feed this measured quantity positively regardless of the speed of the motors.

In some motors the fuel is drawn in by the suction of the piston, the quantity thus drawn in being controlled by a throttling valve, this being adjusted to allow just the proper quantity, depending on the degree of suction; the degree of suction varies with the speed of the motor, and hence different adjustments are necessary for different speeds and for starting; furthermore if the motor is temporarily overloaded, the speed, and consequently the degree of suction being lessened, the quantity of the fuel drawn in will be lessened and as the amount of air drawn in by the piston is same, or even a little greater at slower speeds, than at higher speeds, the resulting charge is too weak or poor in fuel, causing a reduction in power of motor and the charge even failing to ignite, when the motor will stop. In other motors the fuel controlling valve is opened, by some means operated by the motor, for a certain length of time, the size of the fuel feeding opening and the pressure on the fuel being adjusted to feed the proper quantity of fuel at certain speed of the motor; in this mode if the motor slackens in speed too much fuel is fed, this causing a reduction in power of the motor, and sometimes feeding so much fuel as to render the charge too rich to ignite at all. With our device there is no danger of feeding too much nor too little fuel at any speed; we provide means whereby the proper quantity of fuel, for the volume of air drawn in or displaced by the piston of the motor, or otherwise forced into the combustion chamber of the motor, can be measured off, and whereby this quantity, measured off, and no more can be fed into the charge of air, regardless of the speed of the motor.

To attain the above results our device is so constructed, first, to supply the fuel to a suitable receptacle which is arranged to hold the proper and predetermined quantity of that fuel, the supply being arranged to be somewhat in excess of the quantity held by the receptacle or reservoir, this excess being allowed to drain away; then, to shut off the supply just prior to the proper time for feeding the charge of fuel, and thereafter to discharge or feed the charge of fuel contained in the receptacle into the charge of air, the supply of fuel remaining shut off throughout the period of feeding or discharging.

Our device embodying the above features is susceptible of varied embodiments, several of which will be shown further, and it can be easily and readily adapted to any class of internal combustion motors, of either the two-cycle or the four-cycle type. With our device we are also able to positively force, a measured quantity of fuel into the mixing, or the combustion, chamber of the motor, at any period of the charging cycle. This feature is very desirable in self-propelled vehicles, employing internal combustion motors for motive power, and also in portable motors.

Figure 2:
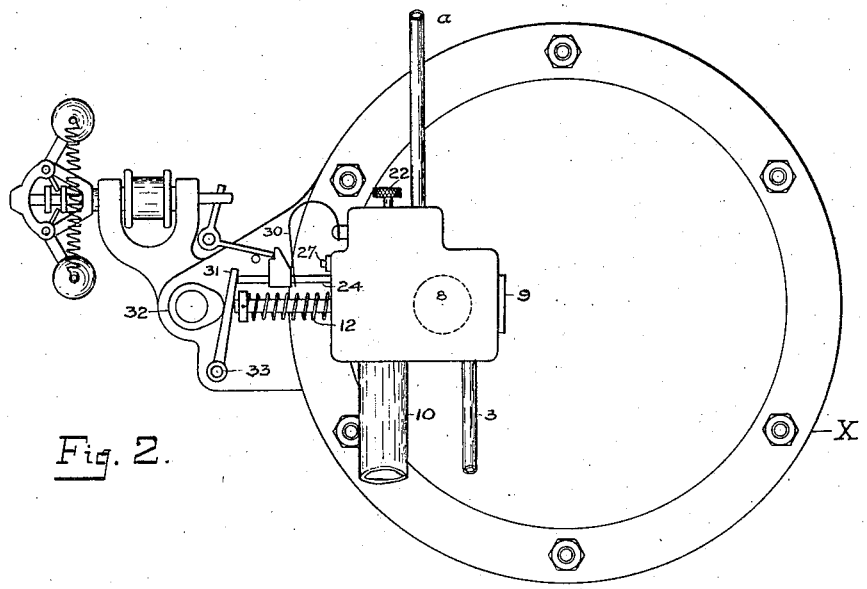
Figure 3:
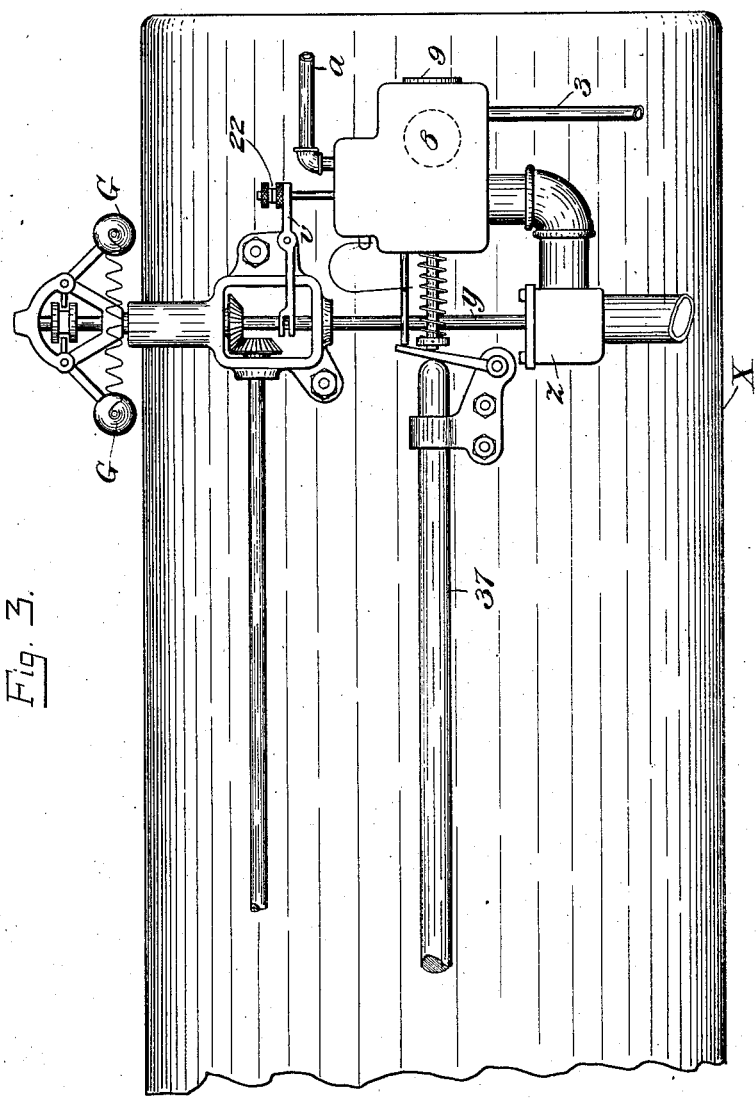
Figure 4:
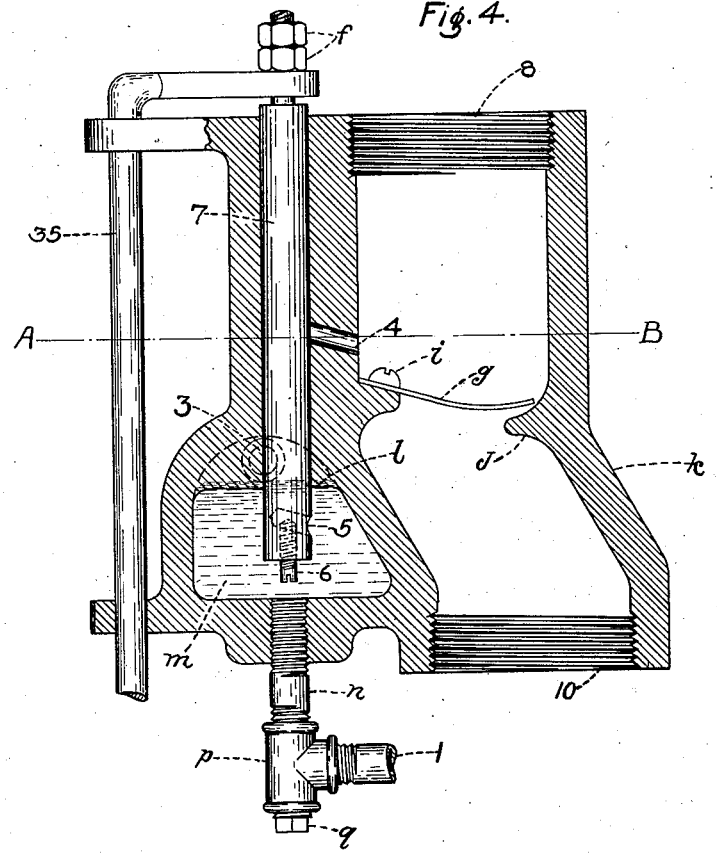
Figure 5:
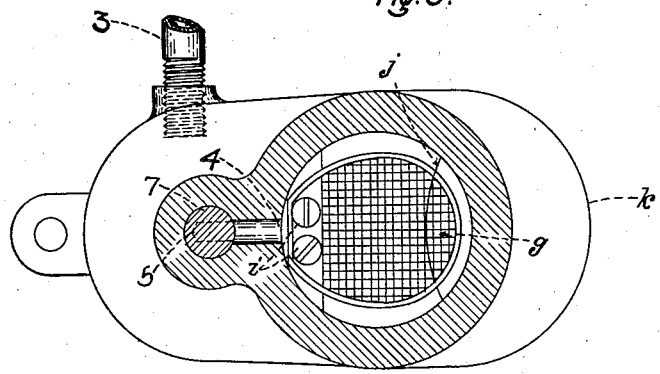
Figure 6:
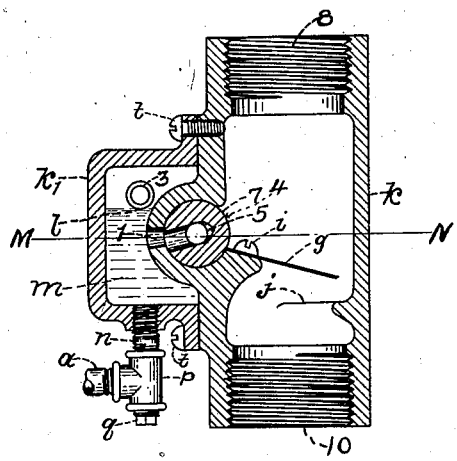
Figure 8:
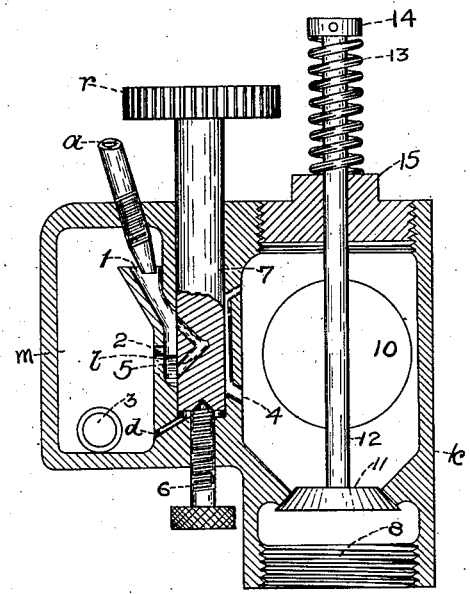
Figure 7:
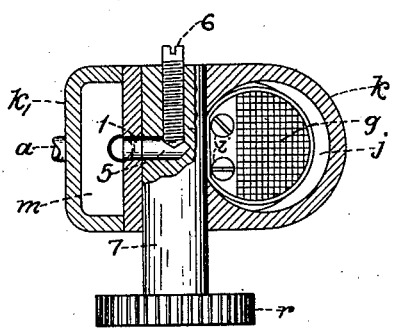
Figure 9:
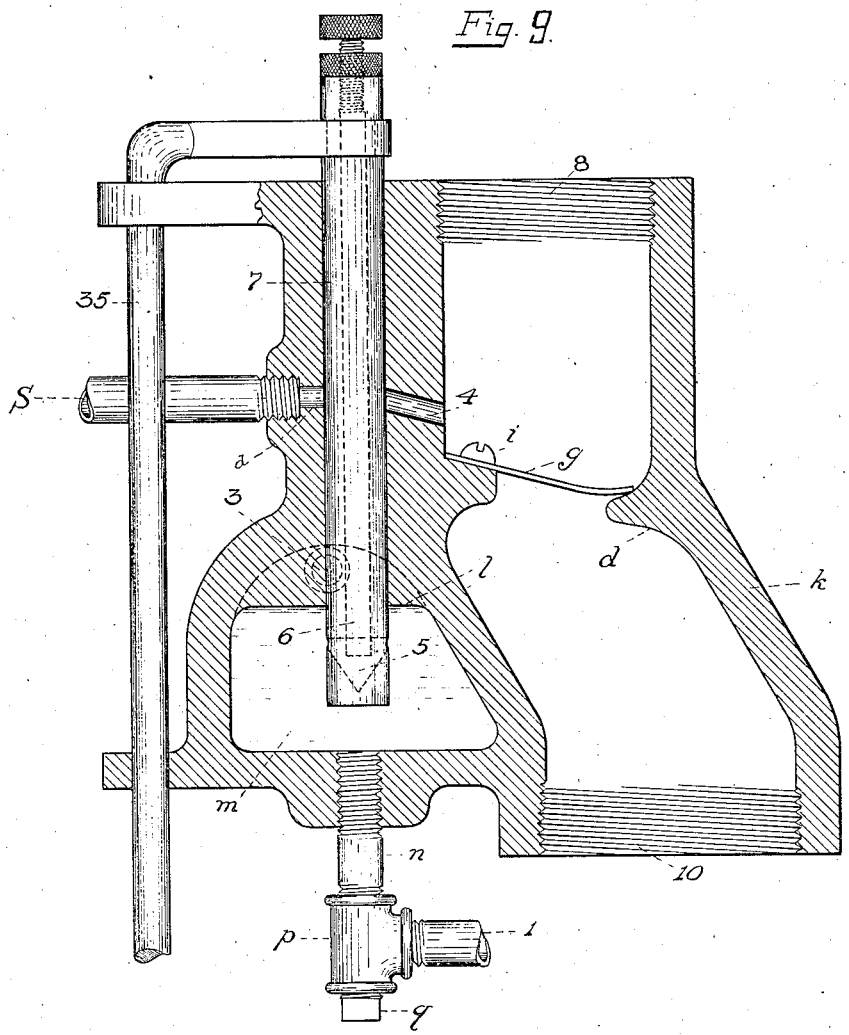

To attain the advantages above pointed out, we construct our device in the novel and peculiar manner clearly shown in the following description, reference being had to the several drawings in which:

Figure 1 is a vertical section of a form of our device as would be especially suitable for stationary motors; Fig. 2 shows this form attached to a motor provided with the hit-or-miss type of governor; and Fig. 3 shows the same form attached to a motor provided with the throttling type of governor. Fig. 4 is a vertical sectional view of a form adapted to both the stationary and the portable motors that are provided with the hit-or-miss type of governor. Fig. 5 is a horizontal sectional view of the same form, taken on the line A—B. Fig. 6 is a vertical sectional view of a form of our device where the measuring receptacle is formed in a revoluble rod or shaft, this shaft or rod being operated by means of a gear or other suitable means connected with the motor. Fig. 7 is a horizontal sectional view of the same form, taken on line M—N. Fig. 8 is a vertical sectional view of a form similar to that shown in Fig. 6, except that the revoluble shaft containing the measuring receptacle is in a vertical position. The object of placing this shaft into a vertical position is to make this form readily adaptable to the throttling mode of speed regulation. Fig. 9 is a vertical sectional view of a form similar to that shown in Fig. 4, but which is arranged with an air inlet opposite the fuel feed outlet which air inlet may be charged with air under pressure, in order that the fuel may be forced out of the fuel receptacle at the proper period. Fig. 10 shows another modification of the form shown in Fig. 1.

In several drawings the similarly functioned parts are designated by the same numerals or characters, as far as has been possible and consistent with the utmost clearness and precision, in the description.

Thus, the numeral 1 designates the supply fuel inlet into the measuring receptacle or cavity 5; numeral 2 the overflow outlet for the surplus fuel from the receptacle 5; opening 3 is the overflow to fuel tank; numeral 4 designates the fuel feeding outlet; numeral 7 designates the means for shutting off the supply to receptacle 5 at the proper period, and this means may also be utilized to convey and discharge or feed the measured charge of fuel into the charge of air. In the above mentioned parts are embodied the principal novel and peculiar features of our device.

Referring now to Fig. 1, $k$ is a hollow shell or casing, provided with an air intake opening 10, a valve seat for air valve 11, a mixing or combustion chamber $c$, which communicates with the cylinder of the motor through the opening 8. Within the casing $k$ is also a chamber $m$, in which is a fuel measuring receptacle 5, with its fuel supply inlet 1, the overflow 2, and the fuel feeding outlet 4. The fuel measuring receptacle 5 is made to hold slightly more fuel than may be required for one charge, of any particular size of motor, the adjustment for proper volume or quantity of fuel for the charge being made by lowering or raising the plug 25, by means of its stem 22. The liquid is admitted through pipe $a$, into the funnel 7, which when in its normal position, directs the fuel into the receptacle 5 through the inlet 1, the surplus of fuel overflowing at 2, and is carried back to fuel tank through opening 3. The funnel 7 is carried on a reciprocating rod 24 which is arranged to be operated by lever 31. This lever 31 is operated by a cam 32 which is suitably operated by the motor shaft, so as to push the rod 24 to the right, carrying with it, the funnel 7 and thus diverting or shutting off the supply of fuel to receptacle 5 through inlet 1; this operation is arranged to take place just before the fuel is to be fed and so timed that the funnel does not return until the fuel has been fed. As shown, the valve 11 is also operated by the lever 31, though the valve may be automatically operated by suction. When the inlet valve 11 is also operated by the lever 31 the lengths of the valve stem 12 and the rod 24 are so proportioned that the rod 24, and hence the funnel 7, is displaced before the valve 11 is moved, and placed after the valve 11 is closed to prevent flooding of the motor with fuel. When the rod 24 returns to its normal position, by means of spring 30, the funnel 7 is again in proper position to direct the flow of fuel into the receptacle 5, to fill this with the proper charge of fuel for the next successive explosive charge. The valve 11 may serve as induction valve of the motor or may be auxiliary to it; also the fuel outlet 4 may be closed by a separate small valve, or in some cases, the extremity of the outlet 4 may be carried to a higher level than that of the overflow 2, and into the suction pipe, and left open, as shown in Fig. 10 the suction of the engine's piston being arranged to draw the measured quantity of fuel from the receptacle.

The operation of this device is as follows: Supply of fuel is admitted through $a$, and the various parts being in normal position as shown, the fuel will be directed to receptacle 5, by the funnel 7, the receptacle 5 will be filled and will hold the proper quantity of fuel for a charge, the surplus overflowing at 2; then as the motor shaft is rotated the cam 32, which is arranged or "timed" to operate the lever 31 at the proper period, the rod 24, with its funnel 7, will be moved so as to divert the flow of fuel from the inlet 1, whereupon the valve 11 is opened, allowing the measured quantity of fuel in the receptacle 5 to discharge through duct 4 into the charge of air, the two mixing (to form the explosive charge) and flowing into the combustion chamber of the motor; no more fuel than is contained in the receptacle can enter into the charge of air, as the fuel supply is diverted from flowing into the receptacle 5 until the outlet 4 is again closed, and the suction has ceased.

In Fig. 2 the above device is shown attached to the cylinder of a motor, the governor of this motor being arranged to engage, through means of levers, the rod 24 when the speed of the motor has exceeded the normal, and to prevent the rod 24 from returning to its normal position, (of directing the fuel into the receptacle) until the speed of the motor has again reached the normal; thus no fuel can enter the measuring receptacle, and hence the fuel charges will be missed until the motor reaches its normal speed again.

In Fig. 3 the same device is shown in use, on a motor, in combination with the throttling or volume governor for speed regulation. By this form of governor the speed of the motor is controlled by varying, simultaneously, the volumes of the components of the explosive charge, in proper proportions. The volume of the explosive charge is thus regulated to give the required amount of impelling force on the piston. The following will explain the operation. Referring to Fig. 3, in the valve box z, which is interposed in the air pipe of the motor, is a valve which is adapted to vary the size of air passage; this valve is actuated by the governor balls G, through means of rod v, in such manner that the air passage is decreased if the speed of the motor exceeds the normal, and increased if the speed falls below the normal. The volume of the air charge is thus decreased or increased, respectively. Simultaneously with operating the air throttle valve, the rod v operates on the plug 25 (Fig. 1) through means of lever v, lowering the plug 25 to decrease the volume of the fuel charge when the volume of the air charge is decreased, and vice versa, the extent of the movement of the plug being so arranged as to maintain the proper proportion of fuel to the air, to always obtain an explosive mixture.

Fig. 4 shows a form of our device in which the measuring receptacle is formed in or carried by a reciprocating rod or plunger, the receptacle being normally submerged in a reservoir m, containing the liquid fuel; at the proper period for feeding the fuel, this plunger is raised, by suitable means operated by the motor's shaft, high enough to bring the receptacle 5 on a level with the outlet or duct 4 in the casing k, when the fuel will be discharged. The adjustment for proper capacity of receptacle is effected by means of screw 6. Otherwise the operation of this form is the same as that of the form first described, namely, admitting the fuel into the measuring receptacle, filling this, and then isolating this measured quantity of fuel and finally feeding it into the charge of air. This form shown in Fig. 4 is best suited to motors using hit-or-miss mode of speed regulation.

Figs. 6 and 7 show a form of our device wherein the measuring receptacle is carried by a revoluble horizontal shaft, the receptacle opening, alternately, into the fuel inlet 1 and the outlet 4; as the receptacle 5 opens into inlet 1, the receptacle 5 is filled with fuel from reservoir m, and as the receptacle opens into outlet 4, upon a half revolution of the shaft carrying it, the fuel will discharge out of the receptacle into the air passage 8—10. The revoluble shaft, as shown, is to be revolved by means of gears, but other means may be employed, whereby the shaft is revolved about one-half of a revolution and then revolved back the same part of a revolution at the proper periods. The adjustment for proper capacity is effected by screw 6. Either hit-or-miss or the throttling mode of speed regulation may be used, the hit-or-miss mode being most desirable, since with the throttling mode of speed regulation, extra parts would have to be added to operate on the adjusting means 6, similarly as is done in Fig. 3, whereas with the hit-or-miss mode of speed regulation, the motion of the revoluble shaft is arrested when the speed of motor exceeds normal, being again put into motion when the speed falls below normal.

Fig. 8 shows a form similar to that shown in Figs. 6 and 7 but in this form the revoluble shaft, carrying the measuring receptacle, is in a vertical position, and is adapted to be raised or lowered slightly to effect a variation in the amount of fuel retained or held by the receptacle; the liquid fuel is kept at a constant level in the reservoir and the bottom, so to speak, of the receptacle is varied with respect to this level of the fuel, thus varying the holding capacity of the receptacle. The revoluble shaft is operated same as in the form shown in Figs. 6 and 7. The form shown in Fig. 8 is readily adapted to motors using the throttling mode of speed regulation, the quantity of fuel fed being varied by raising or lowering the shaft carrying the measuring receptacle (thus varying the holding capacity of the receptacle) by means similar to those shown in Fig. 3 for raising or lowering a plug into the receptacle for accomplishing the same result.

It will be noted that the gist of the operation of the two last mentioned forms is the same as that of the other two forms; namely, that of filling the measuring receptacle with fuel, then isolating this measured quantity of fuel, and thereafter feeding this measured quantity of fuel to the motor, at the proper periods.

Fig. 9 shows the form shown in Figs. 4 and 5 arranged for forcibly feeding the fuel. For this purpose a passage way d is provided, being arranged so that a continuous passage is obtained between pipe S and the air passage 8—10 through fuel outlet 4 and the measuring fuel receptacle 5, when this is raised to the proper height to discharge the fuel into outlet 4. If air under pressure is admitted to the pipe S at the time the continuous passage is established, the fuel in the receptacle 5 will be forced into the air passage 8—10 by the pressure of air in pipe S. With motors employing excessive suction, three or more pounds below atmospheric pressure, the atmospheric pressure will be sufficient to even raise the fuel out of the receptacle, and draw the fuel into the combustion chamber of the motor.

Our invention is susceptible of varied embodiments, other than those shown herein; thus, when a small pump is used to supply fuel to the motor from a tank at some distance from the motor, the action of this pump may be controlled by the governor in a similar way as the action of rod 24 and its funnel (Fig. 1) is controlled, that is, the pump be arranged to supply or pump the fuel into the receptacle intermittently, and alternately with the feeding of fuel into the combustion chamber, the action of the pump being stopped by the governor whenever the speed of the motor exceeds the normal. And the fuel need not be fed directly into the combustion chamber from the receptacle but may be fed into a vaporizing and mixing chamber and therefrom conveyed into the combustion chamber in a form of an explosive or combustible mixture.

Without limiting ourselves to any one precise embodiment, what we claim as new and our invention and desire to secure by Letters Patent is:

1. A fuel feeder for internal combustion motors comprising, in combination, a fuel receptacle provided with fuel inlet and overflow outlet, means for varying and adjusting the capacity of said receptacle, fuel supply for supplying fuel to said receptacle, a fuel feed outlet adapted to convey fuel from said receptacle into the air charged into the motor's cylinder, means for feeding at intervals the fuel from said receptacle through said feed outlet, and means for shutting off the supply of fuel to said receptacle prior to and during said intervals of feeding the fuel.

2. A fuel feeder for internal combustion motors comprising, in combination, a fuel receptacle adapted to hold a predetermined quantity of fuel and provided with a fuel inlet and overflow outlet, means for filling at intermittent intervals the said receptacle with fuel from a fuel supply, a fuel feed outlet adapted to convey fuel from said receptacle into the air charged into the motor's cylinder, means for feeding at intervals the fuel from said receptacle through said fuel feed outlet, and means for shutting off the fuel supply to said receptacle during said interval of feeding the fuel.

3. A fuel feeder for internal combustion motors comprising, in combination, an air conduit in communication with a motor cylinder, a fuel receptacle having a fuel inlet and an overflow outlet, a fuel feed outlet adapted to convey fuel from said fuel receptacle into said air conduit, means for varying the fuel capacity of said receptacle, a fuel supply for supplying fuel to said receptacle, means for feeding at intervals fuel from said receptacle through said fuel feed outlet, and means for shutting off the supply of fuel to said receptacle during said interval of feeding the fuel.

4. A fuel feeder for internal combustion motors comprising, in combination, a casing having an air conduit, a fuel receptacle having a fuel inlet, an overflow outlet, and a fuel feed outlet whose discharge opening is in the said air conduit and above the level of fuel in said receptacle, means for varying the fuel capacity of said receptacle, means for supplying fuel to said receptacle, means for feeding at intermittent intervals the fuel supplied to said receptacle, and means for shutting off the fuel supply to said receptacle during said feeding interval.

5. A fuel feeder for internal combustion motors comprising, in combination, a fuel receptacle of an adjustable capacity and having a fuel inlet and overflow outlet, a fuel feed outlet adapted to convey fuel from said receptacle into the air charged into the motor's cylinder, means for supplying fuel at intermittent intervals to said receptacle, means for feeding from said receptacle the fuel fed thereto at intervals alternate with said intervals of supplying fuel, means for shutting off the fuel supply to the receptacle during said feeding intervals, and a means, operatively connected with a governor, for controlling said means for supplying fuel to the receptacle.

In testimony whereof we have signed our names to this specification in the presence of the subscribing witnesses.

TESLA E. PODLESAK.
HENRY J. PODLESAK.

S. M. HALL,
J. W. MAIR,
G. E. RODGER,
J. METZGER.